United States Patent [19]
Kapitza

[11] Patent Number: 5,949,574
[45] Date of Patent: Sep. 7, 1999

[54] COMPUTER SUPPORTED VIDEO MICROSCOPE

[75] Inventor: Hans-Georg Kapitza, Oberkochen, Germany

[73] Assignee: Carl-Zeiss-Stiftung, Heidenheim, Germany

[21] Appl. No.: 09/136,358

[22] Filed: Aug. 19, 1998

Related U.S. Application Data

[62] Division of application No. 08/621,037, Mar. 22, 1996, abandoned.

[30] Foreign Application Priority Data

Mar. 24, 1995 [DE] Germany .............. 195 10 798

[51] Int. Cl.$^6$ .................. G02B 21/36; G02B 21/04; G02B 7/14; H04N 7/18
[52] U.S. Cl. .................. 359/369; 359/363; 359/379; 359/381; 348/79
[58] Field of Search .................. 359/369, 363, 359/368, 385, 387, 388, 391, 381, 379; 348/79

[56] References Cited

U.S. PATENT DOCUMENTS

| | | |
|---|---|---|
| 4,054,782 | 10/1977 | Weibel .................. 364/525 |
| 4,206,349 | 6/1980 | Kamimura . | |
| 4,361,377 | 11/1982 | Pullen . | |
| 4,514,629 | 4/1985 | Smith et al. . | |
| 4,896,966 | 1/1990 | Boisseau et al. .......... 359/387 |
| 5,006,872 | 4/1991 | Parker .................. 359/363 |
| 5,031,099 | 7/1991 | Kettler . | |
| 5,065,029 | 11/1991 | Krivanek . | |
| 5,144,477 | 9/1992 | White . | |
| 5,521,632 | 5/1996 | Simon, Jr. .............. 359/368 |
| 5,585,964 | 12/1996 | Schalz .................. 359/368 |
| 5,602,674 | 2/1997 | Weissman et al. ......... 359/396 |

FOREIGN PATENT DOCUMENTS 0 529 519 3/1993 European Pat. Off. .
0 642 152 3/1995 European Pat. Off. .

*Primary Examiner*—Jon Henry
*Attorney, Agent, or Firm*—Walter Ottesen

[57] ABSTRACT

The invention relates to a compact microscope 4 especially for medical routine applications. The microscope is configured as a closed housing 8 wherein the specimen 30 to be microscoped is drawn in via an input opening 25. All optical components of the microscope are mounted within the housing. Alternatively, the microscope can be mounted in a standard drive bay of a personal computer 3. All movable components of the microscope are motorically driven and controlled by software via the computer. The specimen can be moved in two mutually perpendicular directions within the microscope to select the object detail of interest. An overview diagram of the specimen is produced with a line sensor when the specimen is drawn in.

37 Claims, 4 Drawing Sheets

COMPUTER SUPPORTED VIDEO MICROSCOPE

This is a divisional of application Ser. No. 08/621,037, filed on Mar. 22, 1996 now abandoned.

BACKGROUND OF THE INVENTION

A computer supported video microscope is known from U.S. Pat. No. 5,031,099. This computer supported video microscope comprises a microscope having a conventional microscope stand, a computer arranged separately with respect thereto and the peripheral apparatus belonging to the computer, namely: a monitor, printer, keyboard, et cetera. The computer includes various insert boards which make possible the communication to the peripheral apparatus as well as driving different motorized functions of the microscope such as the motorized focus drive and the motorized stage. The enormous requirement for space with such non-integrated solutions is disadvantageous because the entire microscope as well as the peripheral apparatus of the computer such as monitor, keyboard and, if required, other input means such as computer mouse or trackball must be arranged one next to the other on the work table.

A module-assembled microscope is also known from British patent application 2,084,754 which comprises a frame having several insert receptacles and wherein the illuminating module and the viewing module can be inserted in different receptacles of this frame. In this way, and depending upon requirements, an upright or an inverse microscope can be selectively realized with the aid of the same optical components. The possibility here is also suggested to connect a video camera with downstream image processing via a video output. The space requirement of this system is, however, at least as large as with the microscope of the above-mentioned United States Patent.

In addition, a monocular compact microscope is described in U.S. Pat. No. 4,361,377 which includes a closed housing and wherein the microscopic specimen can be introduced for viewing into the interior of the housing via a housing opening. Here, a very simple microscope is however described wherein no computer support such as image recordation or image processing is possible.

SUMMARY OF THE INVENTION

It is an object of the invention to provide a computer supported video microscope especially for clinical or pathological routine investigations which has a compact configuration and requires only little space on the work surface of the operator.

The video microscope according to the invention includes a closed housing within which all optical components of the microscope are mounted. The front side of the housing furthermore includes an opening for introducing a microscopic specimen on a standard object carrier. Accordingly, with the invention, a departure from the microscope construction, which was up to now conventional, is provided wherein the objective, condenser and object table are freely accessible. For the user, only the opening slot for introducing the specimen and, if required, the lamp receptacle remain accessible so that the lamp for illuminating the microscopic specimen can be exchanged in case of damage. The housing of the video microscope according to the invention can be especially configured so as to have the shape of a parallelepiped so that the video monitor can be positioned on the microscope. The external housing dimensions then correspond to those of a conventionally-available diskette or compact diskette drive so that the standard housings having an integrated power supply intended therefor can be used. Also, a microscope and such drives or several microscopes can be stacked one atop the other so that the additional space required for the microscope on the work table of the operator is almost nil.

In an alternate embodiment, the microscope is configured to be inserted directly into the drive bays of a personal computer. Preferably, the microscope takes up only one or two positions of standard bay size of 5.25 inches. In this way, the space of empty drive bays which are otherwise unused in computers in so-called rack configuration are utilized. Furthermore, the power supply of the computer can also be applied for the current supply of the microscope at the same time so that an additional power supply for the microscope becomes unneccessary.

For both variations, and for horizontally aligned object planes, the horizontal dimensions of the microscope are greater than the vertical dimensions. Here, the microscope of the invention already distinguishes externally from the conventional microscope configurations.

The control of the entire microscope with the exception of introducing the specimen takes place in both embodiments via the input means to the computer such as keyboard, mouse, touchscreen trackball or trackpad. All. movable optical and mechanical component within the microscope are therefore motorically driven. The electronic components for driving the motorized movements should then be mounted on a drive board outside of the microscope such as on an insert board of the computer. The heat emanating from the drive board is thereby kept from the microscope and can therefore not lead to thermal expansions within the microscope which would disadvantageously influence the beam path. The drive board and the microscope are connected to each other via a digital data path.

A Z-shaped beam path within the microscope is advantageous for an especially compact configuration. The light emitted from a light source is first guided along an optical axis lying in a first plane (an illuminating plane) and is deflected at the center of the microscope by a mirror in a direction perpendicular to the illuminating plane and, after passing through the specimen, the light is deflected by a second mirror along an optical axis lying in a second viewing plane parallel to the first viewing plane. Thereafter, the light is guided in this second plane to a video sensor. The beam path can be additionally folded in each of these planes in order to obtain an adequately long optical path length in the illuminating plane as well as in the viewing plane. A third plane is parallel to the illuminating and to the viewing planes. In this additional plane, a support surface is provided as an object table and is aligned to the insert opening in the housing.

A gripper-like manipulator, which is movable in two mutually perpendicular directions, can be provided for the movement of the specimen to select the specimen detail of interest. This manipulator grabs the specimen when it is introduced into a pregiven transfer position and then slidably guides it to the support surface in the desired position.

Notwithstanding a compact configuration and the omission of exchangeable objectives, different magnifications should be possible. For this reason, the microscope objective is configured to have multiple parts and the front part of the objective containing the front lens or front lens group can be motorically pivoted out of the beam path. At least a second component part of the objective should be motorically displaceable for focussing parallel to its optical axis.

In the microscope of the invention, the specimen introduced into the microscope is not accessible and an orientation on the specimen is therefore not possible. For this reason, a line sensor is mounted in the interior of the housing in the vicinity of the opening and the specimen is pushed past this sensor when inserted. In this way, a coarse overview image of the specimen is generated and displayed on the monitor for orientation. At the same time, if required, a bar code provided on the object carrier can be scanned by means of a diode array and the data coded therein can be stored directly in a memory of the computer. In lieu of, or in addition to a bar code, graphic characters provided on the specimen carrier can be detected by means of an OCR (Optical Character Recognition) image processing software and be stored in a data bank of the computer in the form of corresponding ASCII-symbols.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
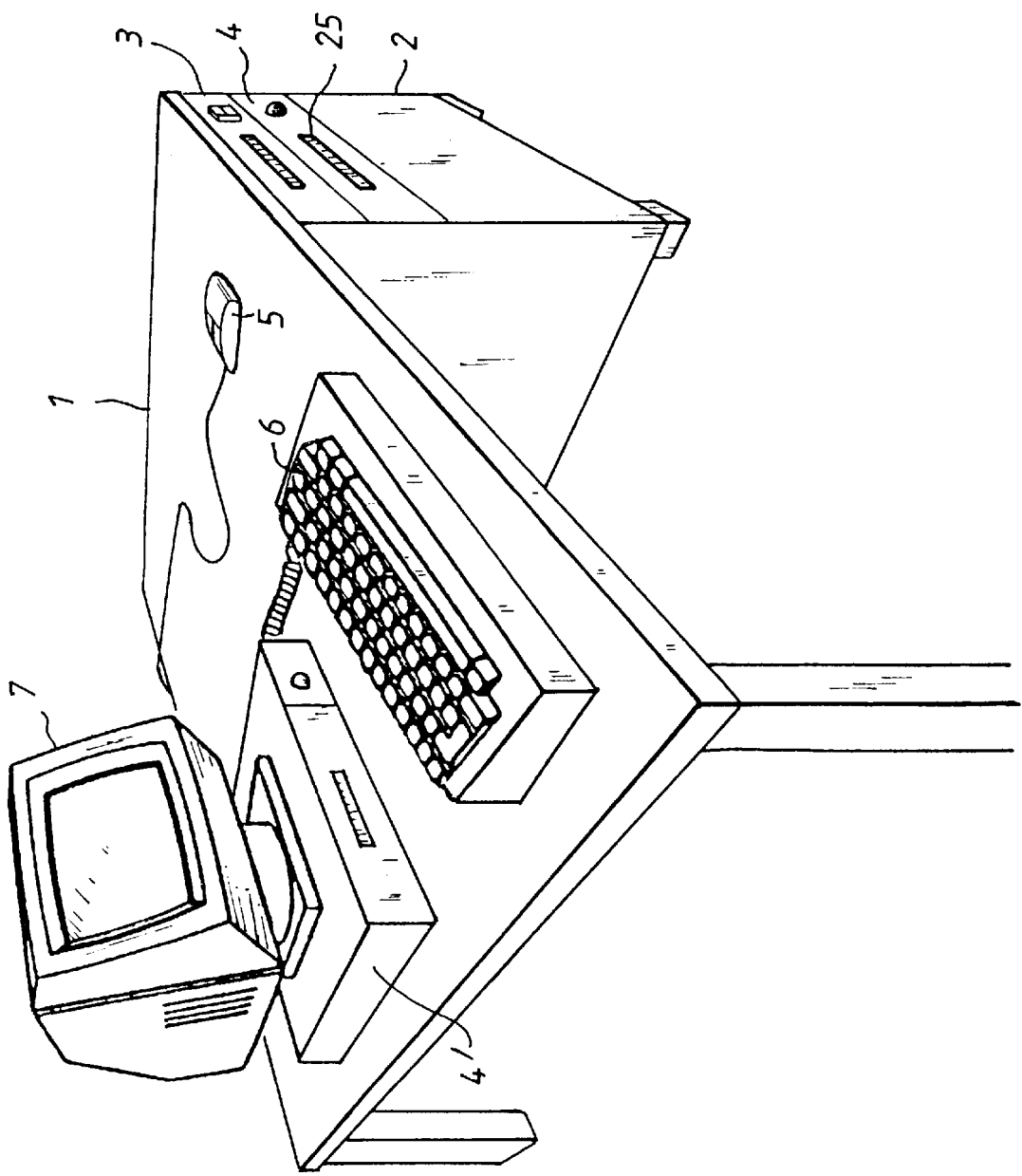
FIG. 1 is a perspective view of a workplace having a microscope according to the present invention.
Figure 4:
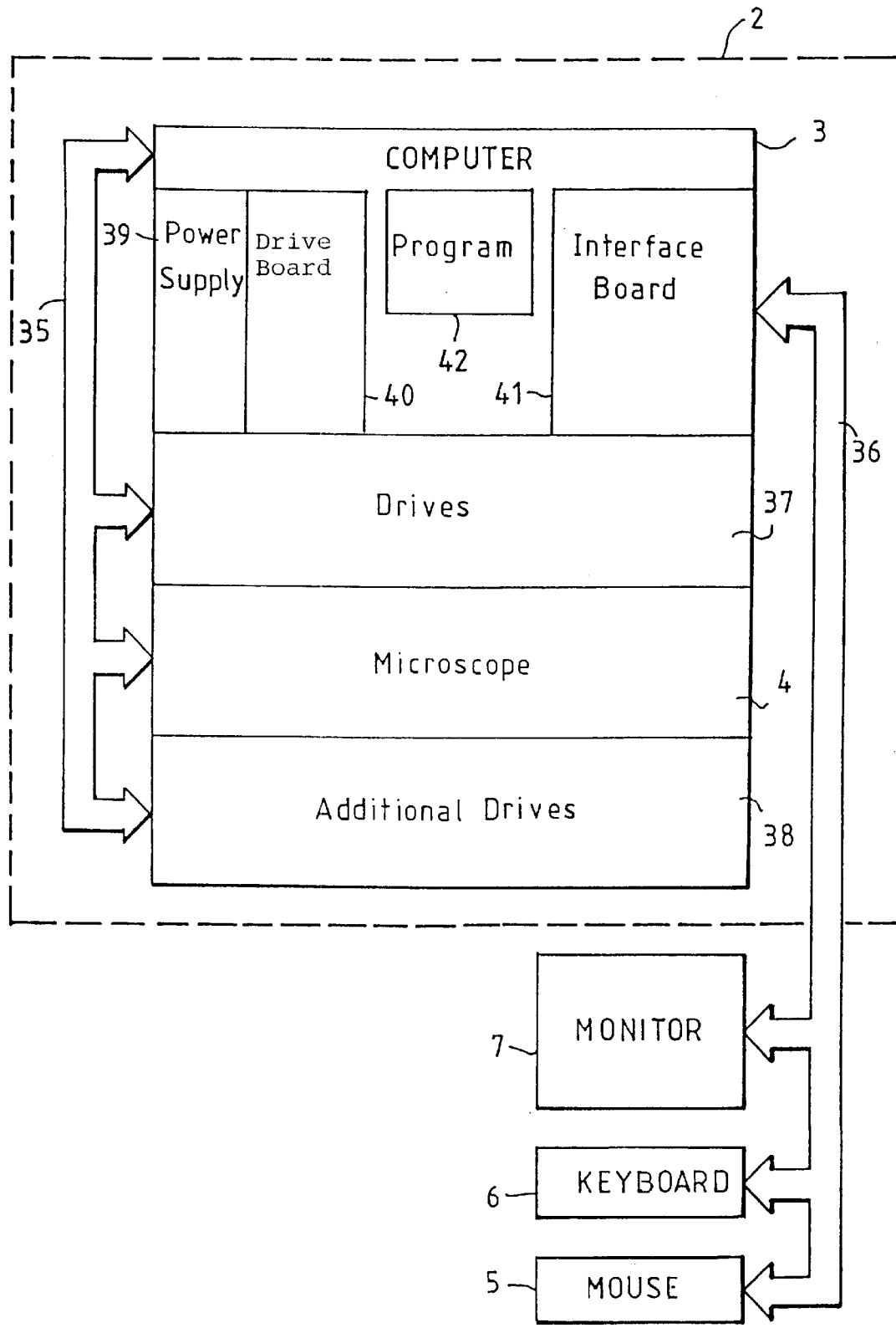

In the perspective view of FIG. 1, reference numeral 1 identifies the work table of the operator. The rack 2 of a personal computer 3 (standing upright) is mounted below the table 1. The microscope 4 is introduced into an available drive bay of the computer rack 2. The remaining drive bays can either be empty or can contain additional microscopes (not shown) of the same configuration or, as indicated in FIG. 4, can contain drives (37, 38) such as floppy disc drives or CD drives. The operation of the microscope 4 takes place (with the exception of insertion and removal of the specimens into or out of the insert opening 25) by means of the computer mouse 5 and the keyboard 6 of the computer. The video monitor 7 serves to display the microscopic images.

The microscope according to the invention occupies no space on the surface of the workplace 1 because of the compact configuration thereof so that only the peripheral apparatus required for operating the computer occupies the workplace. And even when no drive bay is available in the computer rack 2 (for example because all drive bays are occupied or because a so-called desk top computer is used in lieu of a computer having a rack configuration), an alternate configuration of the microscope 4' of the invention can be positioned below the video monitor 7. The microscope 4' includes a standard housing for external drives and an additional connecting cable to the drive board in the computer. In the case of a desk top computer, the computer, the microscope 4' and, if required, one or more drives and the monitor 7 can be stacked one atop the other. Even though the microscope 4' is not configured as an insert but conceived as an additional apparatus, it has approximately the same configuration as the microscope 4 which will be described in greater detail in the following. The only differences are that the microscope 4' includes a separate power supply (not shown) and, in contrast to microscope 4, it is not connected to the rapid PC-bus of the computer 3 but to one of the interface boards of the computer 3.

The computer rack 2 is shown dotted in the block circuit diagram of FIG. 4. The computer 3, several drives (37, 38) and the microscope 4 are mounted within the rack 2 and are connected via the rapid PC-bus 35, for example having a 32-bit data width. The computer power supply 39 functions as the current supply of the microscope 4. A drive board 40 is provided in the computer 3 for the control of the microscope. The electronic components for driving the various motors in the microscope 4 are mounted on the drive board 40. The microscope 4 is controlled via the drive board 40 in correspondence to a program 42 stored in the work memory of the computer 3. The computer 3 is connected in a manner known per se via several interface boards 41 to the peripheral apparatus such as monitor 7, keyboard 8 and mouse 5.

Figure 2:
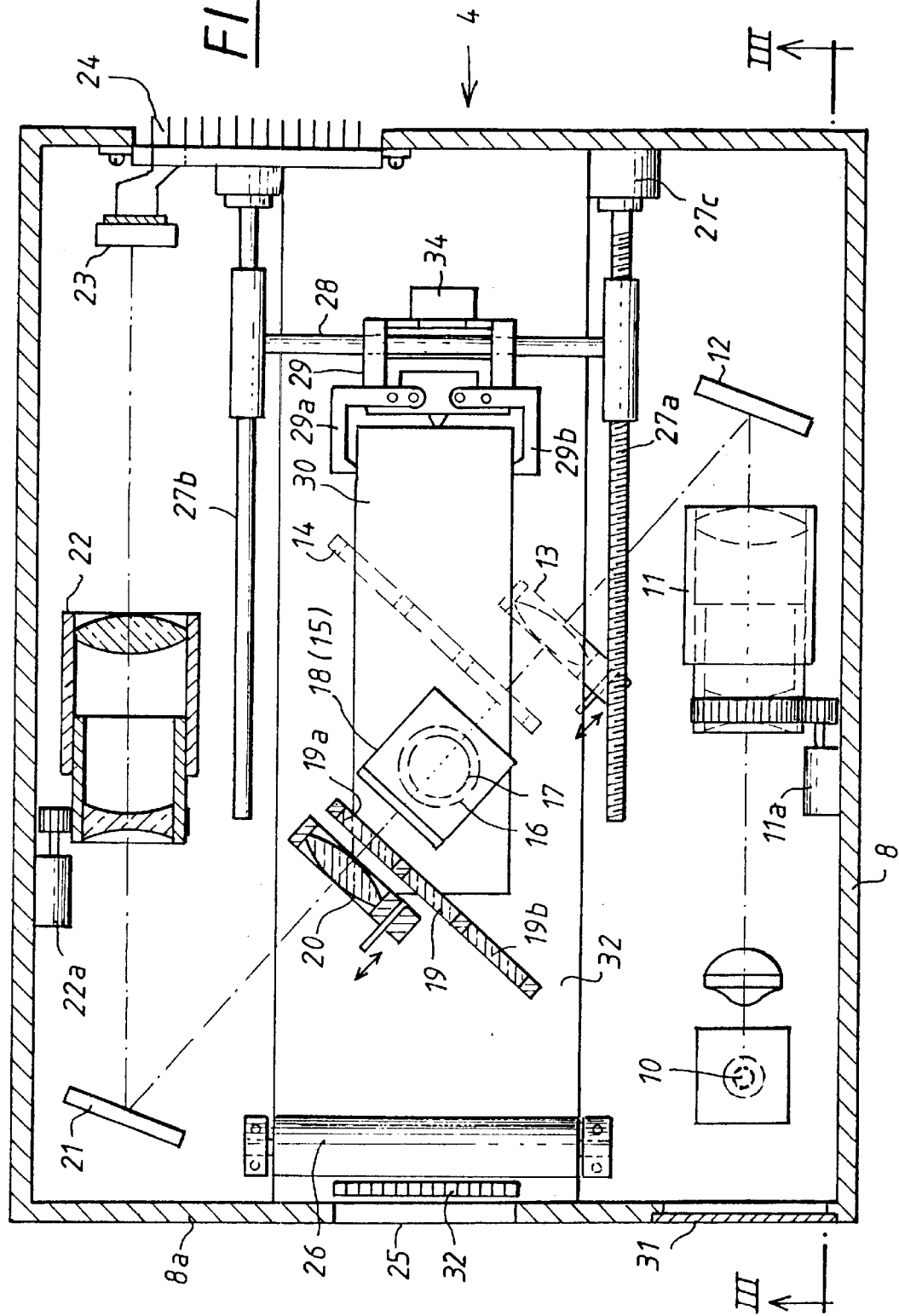
FIG. 2 a section view taken through the viewing plane of the microscope of the invention.
Figure 3:
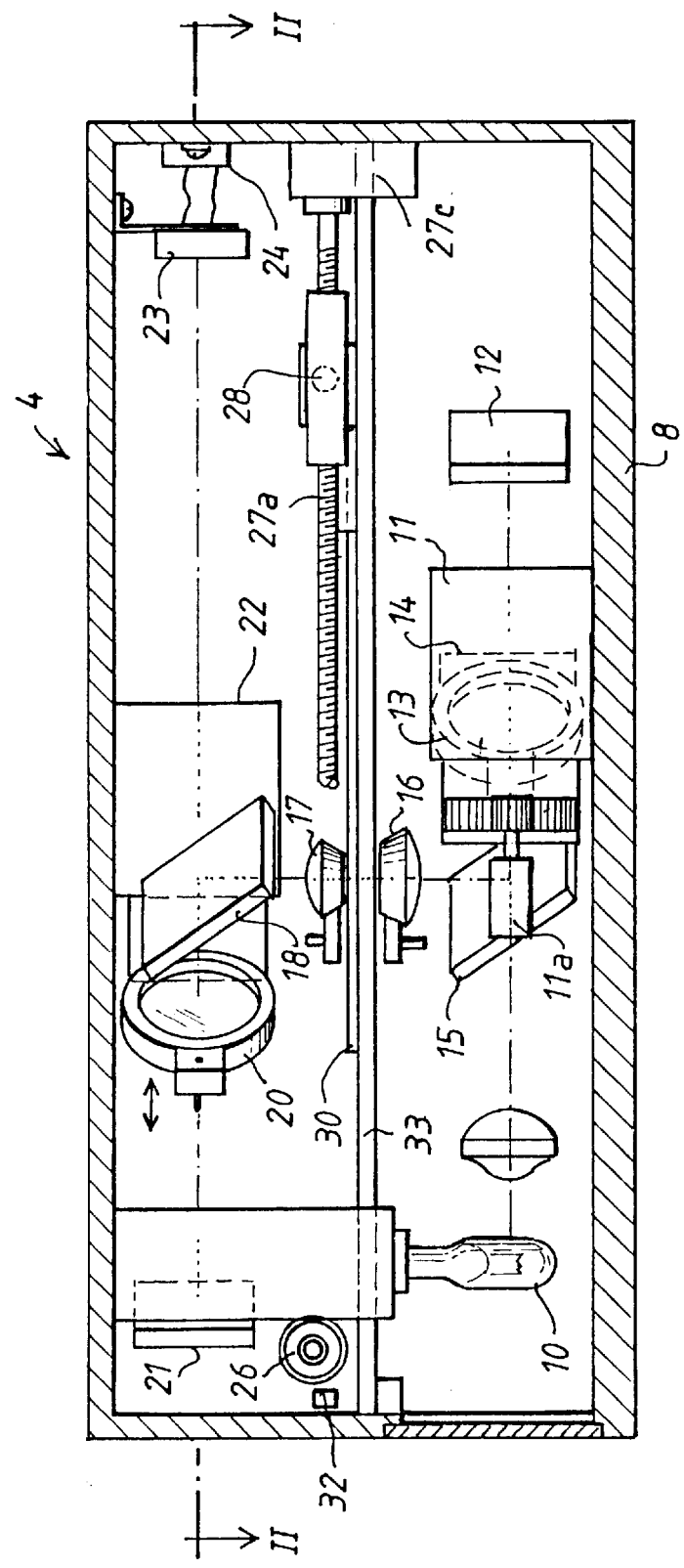
FIG. 3 is a section view through the microscope of FIG. 2 in a plane perpendicular to FIG. 2; and, FIG. 4 is a block circuit diagram of the unit of microscope and computer.

As can be seen in FIGS. 2 and 3, the microscope 4 has an essentially parallelepiped-shaped housing 8 in which all optical and mechanical components of the microscope are mounted. The housing 8 then comprises in a conventional manner (not shown) two or three parts connected to each other, for example, with threaded fasteners. The single opening of the housing is a horizontal slot 25 on the front side 8a of the housing 8 serving as an input opening for the specimen. Furthermore, a cover part 31 which can be removed on the front side 8a is provided next to the input opening 25 so that the lamp 10 can be exchanged.

The beam path is defined by the optical axes of the particular optical components. The beam path is provided within the microscope in essentially two different planes. One of these planes is the viewing plane and corresponds to the section plane of FIG. 2. The second plane is the illuminating plane and lies below the plane of the paper in FIG. 2. The illuminating plane and viewing plane are parallel to each other.

A third plane exists in addition to the illuminating plane and viewing plane and is likewise parallel to the illuminating and viewing planes. This is the specimen plane which is defined by the surface of a transparent plate 33 of glass or glass ceramic and is aligned with the input opening 25.

The light source 10 for the microscope is mounted in the forward region of the housing laterally of the input opening 25. The illuminating beam path first runs from the light source 10 essentially parallel to the side wall of the microscope toward the rear and passes through a condenser zoom unit 11 driven via a motor 11a. The condenser zoom unit 11 functions to fine adjust the illuminating field. Downstream of the condenser zoom unit 11, the illuminating beam path is back deflected at an angle toward the front in the illuminating plane by a mirror 12 and then runs through the first part 13 of a two-part condenser. The illuminating beam path is deflected upwardly perpendicular to the illuminating plane via a downstream mirror 15 and then runs through the second part 16 of the condenser forward of the specimen plane. The second part 16 defines the front part of the condenser. Both condenser parts (13, 16) can contain several lenses or lens groups but are shown in the figures as respective individual lenses for simplification. The aperture of the illuminating beam path and/or the desired contrast method can be adjusted via a motorized diaphragm slider 14 having several apertures of different diameter, annular diaphragms and DIC-prisms. The front part 16 of the condenser can likewise be pivoted motorically out of the beam path for illuminating especially large illuminating fields. A Köhler-type illumination can be realized with the microscope of the invention by adjusting the aperture with the diaphragm slide 14 and adjusting the illuminating field via the condenser zoom unit 11.

The arrangement of the optical components on the viewing end is essentially point symmetrical to the illuminating beam path with respect to the intercept of the optical axis of the illuminating beam path with the speciment plane. The optical components of the front part 17 of the objective are therefore mounted coaxially to the front part 16 of the condenser and can be pivoted motorically out of the beam path for imaging with a low magnification scale. The vertically running beam path is deflected behind th front part 17 of the objective into the viewing plane parallel to the illuminating plane via a further mirror 18. The beam path thereafter runs through a second objective part 20. Likewise, and as with condenser (13, 16), the two objective parts (17, 20) can each include several lenses or lens groups and are shown as individual lenses only for simplification. The beam path is deflected rearwardly in the viewing plane via a downstream mirror 21 and then reaches a camera chip 23 behind viewing zoom 22 driven by a motor 22a.

A further motorized diaphragm slide 19 is mounted in the viewing beam path for specific contrast methods such as, for example, phase contrast or differential interference contrast (DIC). The diaphragm slide 19 has several different switching positions (19a, 19b) of which only two are shown here. The switching positions of this diaphragm slide 19 are coupled to the switch positions of the condenser diaghragm slide 14 via a computer program so that the corresponding contrast demodulator (19a, 19b) can be switched into the beam path when selecting a special contrast method and the corresponding switch position of the diaphragm slide 14. If for example, phase contrast is desired and, corresponding thereto, an annular diaphragm is switched into the beam path via the diaphragm slide 14, then the corresponding phase plate is switched into the viewing beam path automatically via the diaphragm slide 19. The same corresponds also for the differential interference contrast. Then, corresponding mutually adapted DIC-prisms and polarization foils are switched in both at the illuminating end as well as at the viewing end.

Two different transport mechanisms are provided for the transport of a specimen inserted into the input slot 25. The first transport mechanism comprises a specimen take-in device 26 which, for example, can include a motor-driven drive roller mounted directly behind the input slot 25 and above the specimen plane. The specimen is pulled into the interior of the microscope by means of the take-in device 26. In a transfer position, the specimen is grasped by a tong-shaped manipulator (29, 29a, 29b) and is clamped tight by the two jaws (29a, 29b). The clamping movement of the two tong jaws (29a, 29b) takes place via an electromagnet (not shown) or via spring force. The manipulator (29, 29a, 29b) is moveable in two mutually perpendicular directions parallel to the specimen plane. For this purpose, the manipulator (29, 29a, 29b) is itself first guided on a rack 28 and the rack 28 is guided in two mutually parallel rods (27a, 27b) which are each perpendicular to the rack 28. One of the two parallel rods 27a is configured as a threaded rod which is driven by a motor 27c to a rotational movement for the movement of the manipulator 29 in the direction toward the input slot 25. The motor 27c is mounted on the housing. A further micromotor 34 is provided in the manipulator 29 for the drive in the direction perpendicular thereto.

It is here emphasized that in FIGS. 2 and 3, the optical components and the motorized drives are shown; however, their connecting lines to the bus connector strip 24 are not shown for the sake of clarity. All connections between the computer 3 and the microscope are provided via the plug connector strip 24 via which the microscope is connected to the PC-bus 35 (see FIG. 4). The plug connector strip 24 therefore functions as a data input and output.

A diode array 32 is mounted directly behind the input opening 25 for monitoring. This diode array 32 monitors the input opening and simultaneously serves to generate an overview image of the specimen. When a specimen on a carrier 30 is introduced into the input opening 25, the diode array 32 detects the change of the light intensity of the lamp 10 thereon. As an alternative, the diode array together with an additional luminous diode can define a light barrier at the input opening. The output signal of the diode array 32 functions to generate a trigger pulse by means of which the specimen take-in device 26 is switched on. With the alternative having additional luminescent diodes, the lamp 10 itself can be switched on by the trigger pulse. The specimen carrier 30 is transported beneath the diode array during take in and an overview image of the specimen 30 is recorded by scanning in the contact process and thereafter displayed on the monitor. A portion of the light emanating diffusely from the light source 10 is used for the illumination during the generation of this overview image. Insofar as the specimen is provided with a bar code or with a graphic symbol, the data contained therein is decoded in a subsequent image processing of this overview image and stored in a dataset of the computer 3 assigned to the specimen. The take-in device 26 is switched off and the object carrier 30 is taken over by the manipulator (29, 29a, 29b) after the entire object carrier 30 is pulled into the interior of the microscope. Thereafter, the computer cursor on the monitor 7 is positioned on the desired object detail by means of the mouse 5 or a trackball (not shown). The object carrier 30 is displaced in correspondence to the position of the computer cursor via the drives (27c, 34) of the minipulator (29, 29a, 29b) so that the position selected with the computer cursor always corresponds in the overview image to the intercept of the optical axis and the specimen plane. The coordinates of the specimen locations of interest can be read out and stored so that these specimen locations can again be found in a simple manner for later investigations on the conventional microscope with the aid of a table vernier.

The desired contrast method and the desired magnification can be adjusted via the computer keyboard 6. In correspondence to the desired magnification, the front lens 17 of the objective is either pivoted into or out of the beam path and the viewing zoom 22 is adjusted by the drive motor 22a. The illuminating end components such as the front part 16 of the condenser and the condenser zoom it are adjusted program controlled to Köhler illumination. To focus in the sense of a passive autofocus as it is realized, for example, in the above-mentioned U.S. Pat. No. 5,031,099, the second objective part 20 is displaced parallel to tile optical axis in such a manner that the image recorded with the camera chip 23 exhibits maximum contrast. Additionally, and thereafter, refocusing can be manually performed by the mouse or by means of the direction keys on the computer keyboard in order to focus, for example, on contrast weak image details.

The object carrier 30 is moved back by the manipulator (29, 29a, 29b) into the transfer position (wherein the carrier had been taken over previously by the manipulator) when the specimen has been adequately investigated and a further investigation is no longer desired. Thereafter, the carrier is displaced out or the microscope through the input opening 25 by the take-in device 26. Thereafter, the diode array 32 monitors the input opening 25 as to the introduction of a further specimen.

The entire arrangement shown in FIGS. 2 and 3 for the microscope of the invention has approximately a width of 140 mm, a depth of 170 mm and a height of 40 mm or 80 mm. The manipulator 29 for moving the specimen 30 has a clear moving path of over 75 mm in the depth direction of the microscope and of over 25 mm in the width direction of the microscope. In this way, all positions of a conventional object carrier can be brought between the front lenses of the objective and the condenser. The entire beam guidance is configured as compact as possible. For this purpose, the camera chip 23 has a format of at most a half inch and the entire optic within the microscope is designed for correspondingly small image fields. In this way, the focal intercepts of the imaging optics used are reduced to approximately 30% to 50% of the focal intercepts of conventional microscope optics (for image field diameters of approximately 20 mm) which is very advantageous for the compact configuration.

The brightness of the lamp is automatically controlled in correspondence to the image brightness of the image recorded with the camera chip 23. The change of the color temperature resulting from a change of the lamp voltage is thereafter compensated by an adapted weighting of the different color portions of the video image. The digitalized image data are transmitted to the rapid PC-bus with at least 32 bit data width.

No measures were taken yet against mechanical vibrations in the above-described embodiment of the microscope of the invention. If mechanical vibrations cause disturbances, then all optical components can be attached to one or more rigid boards and all of these boards can be supported within an external housing via a viscoelastic material.

The described microscope is especially suited for clinical routine investigations wherein work is carried out mostly in transmitted light and usually only few different magnifications and contrast procedures are required. Of course, a corresponding microscope for observation in reflected light is conceivable wherein it would only be necessary to space the specimen plane further from the illuminating plane in order to provide adequate space for the viewing plane between the specimen plane and the illuminating plane.

The application of the microscope of the invention in the telepathology is especially advantageous because the entire interaction with the specimen takes place via the monitor and since the entire microscope is controlled by software. Accordingly, it becomes convenient to identically control several interconnected microscopes via remote transmission of the control data.

The microscope of the invention can be supplemented also to define an "analysis automat" by adding a feed automat which automatically and sequentially supplies and removes specimen carriers from and to the microscope and via a computer program for automatically working off each of the specimens. Such an "analysis automat" makes it possible to automatically and microscopically work off a great number of like specimens in correspondence to the predefined program sequence.

It is understood that the foregoing description is that of the preferred embodiments of the invention and that various changes and modifications may be made thereto without departing from the spirit and scope of the invention as defined in the appended claims.

What is claimed is:

1. A video microscope arrangement comprising:
   a closed housing having a front wall defining an input opening for introducing a specimen;
   a plurality of optical components for illuminating and viewing said specimen;
   all of said optical components being mounted inside said housing;
   a first group of said optical components defining an illuminating beam path in a first plane and said optical components of said first group including a first mirror deflecting said illuminating beam in a direction perpendicular to said first plane for illuminating said specimen;
   a second group of said optical elements defining a viewing beam path in a second plane parallel to said first plane;
   said second group including a second mirror deflecting the light coming from said specimen into said viewing beam path thereby providing a viewing beam guided along said viewing beam paths;
   an objective in said viewing beam path and said objective having a front part;
   a motorized mechanism for pivoting said front part into and out of said viewing beam path; and,
   said objective having a second part defining an axis and said second part being displaceable parallel to said axis for focusing.

2. The video microscope arrangement of claim 1, further comprising: said housing having a shape corresponding essentially to a parallelepiped; and, said plurality of optical components defining said beam path so that the width and length dimensions of said housing measured horizontally are greater than the dimension of said housing measured vertically.

3. The video microscope arrangement of claim 2, further comprising: selected ones of said optical components being movably mounted in said housing; a motor-driven mechanism for moving said selected ones of said optical components; and, a computer adapted to receive software defining a program for controlling the motorized movements of said selected ones of said optical components.

4. The video microscope arrangement of claim 3, further comprising a drive card mounted externally of said microscope and containing electronic components thereon for controlling said motor-driven mechanism to control the movements of said selected ones of said optical components; and, a digital data path interconnecting said microscope and said drive card.

5. The video microscope arrangement of claim 1, further comprising a specimen table having a supporting surface for a specimen carrier; and, said supporting surface defining a third plane parallel to said first and second planes.

6. The video microscope arrangement of claim 5, further comprising a manipulator mounted in said housing so as to be movable in two mutually perpendicular directions for grasping and positioning said specimen carrier to bring said specimen into defined positions.

7. A video microscope arrangement comprising:
   a closed housing having a front wall defining an input opening for introducing a specimen;
   a plurality of optical components for illuminating and viewing said specimen;
   all of said optical components being mounted inside said housing;
   a first group of said optical components defining an illuminating beam path in a first plane and said optical components of said first group including a first mirror deflecting said illuminating beam in a direction perpendicular to said first plane for illuminating said specimen;

a second group of said optical elements defining a viewing beam path in a second plane parallel to said first plane;

said second group including a second mirror deflecting the light coming from said specimen into said viewing beam path thereby providing a viewing beam guided along said viewing beam path; and, a linear sensor mounted in said housing in the vicinity of said input opening for generating an overview image of said specimen when said specimen is passed into said housing.

8. The video microscope arrangement of claim 7, further comprising a motorized take-in device for drawing said specimen into the interior of said microscope housing; and, said linear sensor being adapted to generate a trigger signal for initiating operation of said motorized take-in device whereby said device draws said specimen into said interior.

9. A video microscope arrangement comprising:

a closed housing having a front wall defining an input opening for introducing a specimen;

a plurality of optical components for illuminating and viewing said specimen;

all of said optical components being mounted inside said housing;

a first group of said optical components defining an illuminating beam path in a first plane and said optical components of said first group including a first mirror deflecting said illuminating beam in a direction perpendicular to said first plane for illuminating said specimen;

a second group of said optical elements defining a viewing beam path in a second plane parallel to said first plane;

said second group including a second mirror deflecting the light coming from said specimen into said viewing beam path thereby Providing a viewing beam guided along said viewing beam path;

said first mirror deflecting said illuminating beam path within said first plane and said first group further including a second mirror downstream of said first mirror deflecting said illuminating beam path in a direction perpendicular to said first plane for illuminating said specimen; and, said second mirror of said second group being a third mirror deflecting the light coming from said specimen into said second plane and said second group further including a fourth mirror for deflecting said viewing beam path within said second plane thereby providing said viewing beam guided along said viewing beam path.

10. The video micro scope arrangement of claim 9, further comprising: said housing having a shape corresponding essentially to a parallelepiped; and, said plurality of optical components defining said beam path so that the width and length dimensions of said housing measured horizontally are greater than the dimension of said housing measured vertically.

11. The video microscope arrangement of claim 9, further comprising: selected ones of said optical components being movably mounted in said housing; a motor-driven mechanism for moving said selected ones of said optical components; and, a computer adapted to receive software defining a program for controlling the motorized movements of said selected ones of said optical components.

12. The video microscope arrangement of claim 11, further comprising a drive card mounted externally of said microscope and containing electronic components thereon for controlling said motor-driven mechanism to control the movements of said selected ones of said optical components; and, a digital data path interconnecting said microscope and said drive card.

13. The video microscope arrangement of claim 9, further comprising a specimen table having a supporting surface for a specimen carrier; and, said supporting surface defining a third plane parallel to said first and second planes.

14. The video microscope arrangement of claim 13, further comprising a manipulator mounted in said housing so as to be movable in two mutually perpendicular directions for grasping and positioning said specimen carrier to bring said specimen into defined positions.

15. The video microscope arrangement of claim 9, further comprising an objective in said viewing beam path and said objective having a front part; and, a motorized mechanism for pivoting said front part into and out of said viewing beam path.

16. The video microscope arrangement of claim 15, said objective having a second part defining an axis and said second part being displaceable parallel to said axis for focusing.

17. The video microscope arrangement of claim 9, further comprising:

said housing having a shape corresponding essentially to a parallelepiped;

said plurality of optical components defining said beam path so that the width and length dimensions of said housing measured horizontally are greater than the dimension of said housing measured vertically;

selected ones of said optical components being movably mounted in said housing;

a motor-driven mechanism for moving said selected ones of said optical components;

a computer adapted to receive software defining a program for controlling the motorized movements of said selected ones of said optical components;

a drive card mounted externally of said microscope and containing electronic components thereon for controlling said motor-driven mechanism to control the movements of said selected ones of said optical components; and, a digital data path interconnecting said microscope and said drive card.

18. A video microscope arrangement comprising:

a closed housing having a front wall defining an input opening for introducing a specimen;

a plurality of optical components for illuminating and viewing said specimen;

a camera chip for recording an image of said specimen;

all of said optical components and said camera chip being mounted inside said housing;

a first group of said optical components defining an illuminating beam path in a first plane and said first group including a first mirror deflecting said illuminating beam path within said first plane and a second mirror downstream of said first mirror deflecting said illuminating beam path in a direction perpendicular to said first plane for illuminating said specimen; and, a second group of said optical components defining a viewing beam path in a second plane parallel to said first plane and said second group including a third mirror deflecting the light coming from said specimen into said second plane and a fourth mirror deflecting said viewing beam path within said second plane and toward said camera chip.

19. The video microscope arrangement of claim 18, further comprising: said housing having a shape corresponding essentially to a parallelepiped; and, said plurality of optical components defining said beam path so that the width and length dimensions of said housing measured horizontally are greater than the dimension of said housing measured vertically.

20. The video microscope arrangement of claim 18, further comprising: selected ones of said optical components being movably mounted in said housing; a motor-driven mechanism for moving said selected ones of said optical components; and, a computer adapted to receive software defining a program for controlling the motorized movements of said selected ones of said optical components.

21. The video microscope arrangement of claim 20, further comprising a drive card mounted externally of said microscope and containing electronic components thereon for controlling said motor-driven mechanism to control the movements of said selected ones of said optical components; and, a digital data path interconnecting said microscope and said drive card.

22. The video microscope arrangement of claim 18, further comprising a specimen table having a supporting surface for a specimen carrier; and, said supporting surface defining a third plane parallel to said first and second planes.

23. The video microscope arrangement of claim 22, further comprising a manipulator mounted in said housing so as to be movable in two mutually perpendicular directions for grasping and positioning said specimen carrier to bring said specimen into defined positions.

24. The video microscope arrangement of claim 18, further comprising an objective in said viewing beam path and said objective having a front part; and, a motorized mechanism for pivoting said front part into and out of said viewing beam path.

25. The video microscope arrangement of claim 24, said objective having a second part defining an axis and said second part being displaceable parallel to said axis for focusing.

26. Combination of a video microscope and a computer, the combination comprising:

said computer being a personal computer including drive bays;

said video microscope including modules adapted to fit into corresponding ones of said drive bays; and, at least one of said modules including:

(a) a closed housing having a front wall defining an input opening for introducing a specimen;

(b) a plurality of optical components for illuminating and viewing said specimen and all of said optical components being mounted inside said housing;

(c) a first group of said optical components defining an illuminating beam path in a first plane and said optical components of said first group including a first mirror deflecting said illuminating beam in a direction perpendicular to said first plane for illuminating said specimen;

(d) a second group of said optical elements defining a viewing beam path in a second plane parallel to said first plane; and, (e) said second group including a second mirror deflecting the light coming from said specimen into said viewing beam path thereby providing a viewing beam guided along said viewing beam path.

27. The combination of claim 26, said personal computer including a power supply; and, said power supply being adapted to supply current to said video microscope.

28. The combination of claim 26, further comprising said housing having a shape corresponding essentially to a parallelepiped; and, said plurality of optical components defining said beam path so that the width and length dimensions of said housing measured horizontally are greater than the dimension of said housing measured vertically.

29. The combination of claim 26, further comprising: selected ones of said optical components being movably mounted in said housing; a motor-driven mechanism for moving said selected ones of said optical components; and, said personal computer being adapted to receive software defining a program controlling the motorized movements of said selected ones of said optical components.

30. The combination of claim 29, further comprising a drive card mounted externally of said microscope and containing electronic components thereon for controlling said motor-driven mechanism to control the movements of said selected ones of said optical components; and, a digital data path interconnecting said microscope and said drive card.

31. The combination of claim 26, further comprising a specimen table having a supporting surface for supporting said specimen carrier; and, said supporting surface defining a third plane parallel to said first and second planes.

32. The combination of claim 31, further comprising a manipulator mounted in said housing so as to be movable in two mutually perpendicular directions for grasping and positioning said specimen carrier to bring said specimen into defined positions.

33. The combination of claim 26, further comprising an objective in said viewing beam path and said objective having a front part; and, a motorized mechanism for pivoting said front part into and out of said viewing beam path.

34. The combination of claim 33, said objective having a second part defining an axis and said second part being displaceable parallel to said axis for focusing.

35. The combination of claim 26, further comprising a linear sensor mounted in said housing in the vicinity of said input opening for generating an overview image of said specimen when said specimen is passed into said housing.

36. The combination of claim 35, further comprising a motorized take-in device for drawing said specimen into the interior of said microscope housing; and, said linear sensor being adapted to generate a trigger signal for initiating operation of said motorized take-in device whereby said device draws said specimen into said interior.

37. The video microscope arrangement of claim 26, said first mirror deflecting said illuminating beam path within said first plane and said first group further including a second mirror downstream of said first mirror deflecting said illuminating beam path in a direction perpendicular to said first plane for illuminating said specimen; and, said second mirror of said second group being a third mirror deflecting the light coming from said specimen into said second plane and said second group further including a fourth mirror for deflecting said viewing beam path within said second plane thereby providing said viewing beam guided along said viewing beam path.

* * * * *

UNITED STATES PATENT AND TRADEMARK OFFICE
CERTIFICATE OF CORRECTION

PATENT NO.   : 5,949,574
DATED         : September 7, 1999
INVENTOR(S)  : Hans-Georg Kapitza It is certified that error appears in the above-identified patent and that said Letters Patent is hereby corrected as shown below:

Column 2,
Line 24: delete "to" and substitute -- of -- therefor.
Line 26: delete "components" and substitute -- component -- therefor.

Column 3,
Line 24: between "2" and "a", insert -- is --.

Column 5,
Line 6:  delete "speciment" and substitute -- specimen -- therefor.
Line 11: delete "th" and substitute -- the -- therefor.

Column 6,
Line 35: delete "minipulator" and substitute -- manipulator -- therefor.
Line 49: delete "it" and substitute -- 11 -- therefor.
Line 54: delete "tile" and substitute -- the -- therefor.
Line 64: delete "or" and substitute -- of -- therefor.

Column 8,
line 17: delete "paths;" and substitute -- path; -- therefor.

UNITED STATES PATENT AND TRADEMARK OFFICE
CERTIFICATE OF CORRECTION

PATENT NO.   : 5,949,574
DATED        : September 7, 1999
INVENTOR(S)  : Hans-Georg Kapitza It is certified that error appears in the above-identified patent and that said Letters Patent is hereby corrected as shown below:

Column 9,
Line 37: delete "Providing" and substitute -- providing -- therefor.
Line 52: delete "micro scope" and substitute -- microscope -- therefor.

Signed and Sealed this

Thirty-first Day of July, 2001

*Attest:*

*Nicholas P. Godici*

*Attesting Officer*

NICHOLAS P. GODICI
*Acting Director of the United States Patent and Trademark Office*